(12) United States Patent
Liu

(10) Patent No.: US 11,513,827 B2
(45) Date of Patent: Nov. 29, 2022

(54) METHODS, BLOCKCHAIN NODES AND STORAGE MEDIA FOR EXECUTING SMART CONTRACTS

(71) Applicant: ALIPAY (HANGZHOU) INFORMATION TECHNOLOGY CO., LTD., Zhejiang (CN)

(72) Inventor: Qi Liu, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/355,976

(22) Filed: Jun. 23, 2021

(65) Prior Publication Data

US 2021/0318896 A1 Oct. 14, 2021

(30) Foreign Application Priority Data

Aug. 31, 2020 (CN) ......................... 202010899209.1

(51) Int. Cl.
*G06F 9/455* (2018.01)
*G06F 8/41* (2018.01)
*G06F 9/46* (2006.01)

(52) U.S. Cl.
CPC ............ *G06F 9/4552* (2013.01); *G06F 8/443* (2013.01); *G06F 9/45508* (2013.01); *G06F 9/466* (2013.01)

(58) Field of Classification Search
CPC .... G06F 9/4552; G06F 9/45508; G06F 9/466; G06F 8/443

(Continued)

(56) References Cited

U.S. PATENT DOCUMENTS

2005/0136939 A1 6/2005 Mountain et al.
2010/0180255 A1* 7/2010 Chung .................... G06F 8/443
717/110

(Continued)

FOREIGN PATENT DOCUMENTS

CN 101346706 1/2009
CN 108196872 6/2018
(Continued)

OTHER PUBLICATIONS

Brown [online], "EOS 2.0 Announced With Multi-threading and EOS VM JIT Compiler," Oct. 7, 2019, retrieved on or before Jul. 7, 2021, retrieved from URL<https://www.kompulsa.com/2019/10/07/eos-2-0-released-with-multi-threading-and-eos-vm-jit-compiler/>, 5 pages.

(Continued)

*Primary Examiner* — Chat C Do
*Assistant Examiner* — Bradford F Wheaton
(74) *Attorney, Agent, or Firm* — Fish & Richardson P.C.

(57) ABSTRACT

A computer-implemented method, non-transitory, computer-readable medium, and computer-implemented system are provided for executing a smart contract in a blockchain network. The computer-implemented method includes, in response to determining that a smart contract is deployed on a blockchain node in a blockchain network comprising a plurality of blockchain nodes, starting, by the blockchain node, to turn a bytecode of the smart contract into a machine code of the smart contract through Just-In-Time (JIT) compilation; storing, by the blockchain node, the machine code of the smart contract locally; performing a determination of whether the machine code of the smart contract is stored locally by the blockchain node and a number of blockchain nodes storing the machine code of the smart contract in the blockchain network is not less than a predetermined number;

(Continued)

and executing, by the blockchain node, the smart contract based on the determination.

20 Claims, 9 Drawing Sheets

(58) Field of Classification Search
USPC .......................................................... 717/148
See application file for complete search history.

(56) References Cited

U.S. PATENT DOCUMENTS

| | | | | |
|---|---|---|---|---|
| 2010/0313079 | A1* | 12/2010 | Beretta | G06F 9/5055 714/48 |
| 2011/0154305 | A1* | 6/2011 | LeRoux | G06F 8/71 717/140 |
| 2017/0139693 | A1* | 5/2017 | Li | G06F 8/443 |
| 2017/0351643 | A1* | 12/2017 | Demers | H04L 51/02 |
| 2019/0173667 | A1* | 6/2019 | Wang | G06F 21/31 |
| 2019/0386880 | A1* | 12/2019 | Dhanabalan | H04L 41/12 |
| 2020/0278888 | A1* | 9/2020 | Connor | G06F 17/16 |
| 2020/0327100 | A1* | 10/2020 | Androulaki | G06Q 20/3829 |
| 2020/0327546 | A1* | 10/2020 | Pennington | G06Q 20/3823 |
| 2021/0073811 | A1* | 3/2021 | Chan | H04L 9/32 |
| 2021/0091926 | A1* | 3/2021 | Ramaswamy | H04L 9/12 |

FOREIGN PATENT DOCUMENTS

| | | |
|---|---|---|
| CN | 109564521 | 4/2019 |
| CN | 109840429 | 6/2019 |
| CN | 110032883 | 7/2019 |
| CN | 110096338 | 8/2019 |
| CN | 110543338 | 12/2019 |
| CN | 111061484 | 4/2020 |
| CN | 111090875 | 5/2020 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Medium.com [online], "Ontology Wasm-JIT Released: A Leading Smart Contract Virtual Machine with High Speed and Performance," Mar. 12, 2020, retrieved on Jul. 7, 2021, retrieved from URL<https://medium.com/ontologynetwork/ontology-wasm-jit-released-a-leading-smart-contract-virtual-machine-with-high-speed-and-519783fe5055>, 4 pages.

Nakamoto, "Bitcoin: A Peer-to-Peer Electronic Cash System," www.bitcoin.org, 2005, 9 pages.

Bitcoinwiki.org [online], "Practical Byzantine Fault 1-15 Tolerance (pBFT)—BitcoinWiki," May 22, 2020, retrieved on Nov. 25, 2021, retrieved from URL<https://en.bitcoinwiki.org/ index.php?title=PBFT&oldid=383857>, 4 pages.

Dong et al., "Celer Network: Bring Internet Scale to Every Blockchain," arXiv, Sep. 28, 2018, 56 pages.

EP Extended Search Report in European Application No. 21182347.1, dated Dec. 17, 2021, 12 pages.

* cited by examiner

METHODS, BLOCKCHAIN NODES AND STORAGE MEDIA FOR EXECUTING SMART CONTRACTS

CROSS-REFERENCE TO RELATED APPLICATIONS

This application claims priority to Chinese Patent Application No. 202010899209.1, filed on Aug. 31, 2020, which is hereby incorporated by reference in its entirety.

TECHNICAL FIELD

Embodiments of the present specification relate to the technical field of blockchain, particularly to methods, blockchain nodes and storage media for executing smart contracts.

BACKGROUND

Blockchain is a new application mode of computer technology such as distributed data storage, point-to-point transmission, consensus mechanism, and encryption algorithm. In blockchain 2.0 era, smart contracts are introduced so that the scope of application of blockchain is raised to a new level. With the smart contacts, what the blockchain can do is not only making a single money-transfer transaction, but also calling a piece of code which is user customizable.

SUMMARY

The present specification is to provide methods, blockchain nodes and storage media for executing smart contracts.

Methods, blockchain nodes and storage media for executing smart contracts, provided by embodiments of the present specification are implemented in the following methods:

A method of executing a smart contract, including:

receiving, by a blockchain node, a request for creating a smart contract, where the request includes a bytecode of the smart contract;

starting, by the blockchain node when the blockchain node completes deployment of the smart contract, to turn a bytecode of the smart contract into a machine code through Just-In-Time (JIT) compilation and store the machine code; and when the blockchain node is to execute the smart contract deployed, the machine code of the smart contract is stored locally, and the number of blockchain nodes storing the machine code of the smart contract in a blockchain network is not less than a predetermined number, executing, by the blockchain node, the machine code.

A method of executing a smart contract, including:

starting, by a blockchain node when the blockchain node deployed the smart contract, to turn a bytecode of the smart contract into a machine code through JIT compilation and store the machine code; and when the blockchain node is to execute the smart contract deployed, the machine code of the smart contract is stored locally, and the number of blockchain nodes storing the machine code of the smart contract in a blockchain network is not less than a predetermined number, executing, by the blockchain node, the machine code.

A blockchain node for executing a smart contract, configured to execute the above-mentioned method.

A blockchain node for executing a smart contract, including:

a processor, and a memory with a program stored therein, wherein the above-mentioned method is executed when the processor executes the program.

A storage medium for storing a program, when the program is executed, the operation of the above-mentioned method is performed.

With the above-mentioned embodiments of the present specification, when the number of blockchain nodes storing a machine code of a smart contract in the blockchain network is not less than a predetermined number, the blockchain node storing the machine code locally can directly execute the machine code without waiting for the blockchain node not storing the machine code to complete compilation, and because the machine code itself can be directly executed by the CPU, the blockchain node can greatly improve the speed of executing smart contracts. Moreover, because the number of blockchain nodes executing the machine code is not less than the predetermined number, even if the blockchain nodes not storing the machine code interpret and execute a bytecode of the smart contract and the result of interpretation and execution is different from the execution result of the machine code, no blockchain forks will occur, thus ensuring the stability of the blockchain.

BRIEF DESCRIPTION OF DRAWINGS

FIG. 6-1 is a flowchart of executing a smart contract according to an embodiment;

FIG. 6-2 is a flowchart of executing a smart contract according to another embodiment;

DETAILED DESCRIPTION OF EMBODIMENTS

Figure 1:
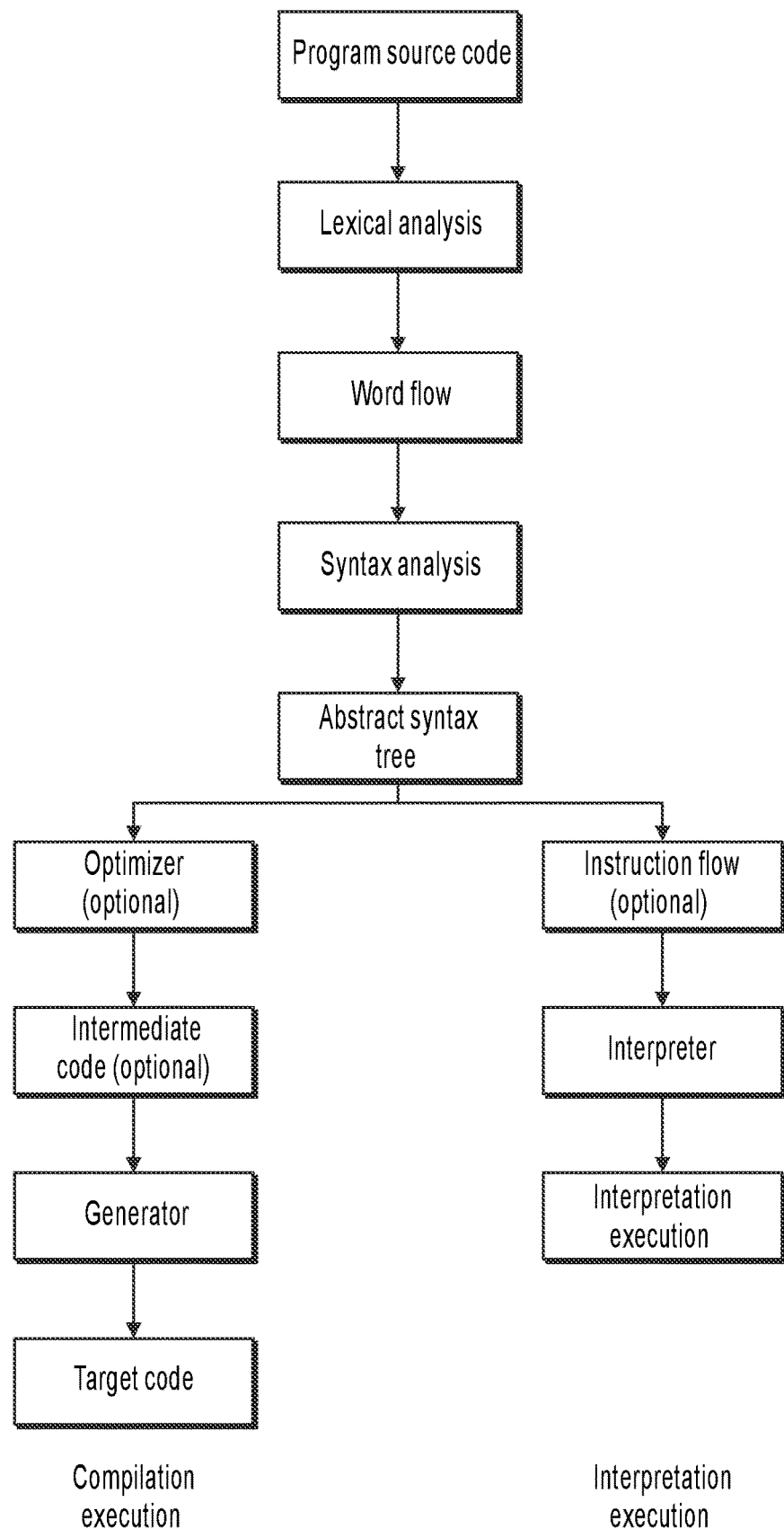
FIG. 1 is a schematic diagram of compilation execution and interpretation execution according to one embodiment.

The explanatory embodiments are described in detail herein, and are illustratively shown in the drawings. When the following description refers to the drawings, unless otherwise indicated, the same numbers in different drawings indicate the same or similar elements. The embodiments described in the following explanatory embodiments do not represent all embodiments consistent with one or more embodiments of the present specification. On the contrary, they are merely examples of apparatuses and methods consistent with some aspects of one or more embodiments of the present specification and described in detail in the appended claims.

It should be noted that, in other embodiments, the steps of corresponding methods are not necessarily performed based on a sequence shown and described in this specification. In some other embodiments, the methods can include more or fewer steps than those described in this specification. Moreover, a single step described in the present specification can be divided into a plurality of steps for description in other embodiments; and a plurality of steps described in the present specification can be combined into a single step for description in other embodiments.

The Blockchain 1.0 era usually refers to the development stage of blockchain applications represented by the bitcoin between 2009 and 2014, and mainly focuses on solving the problem of decentralization of currency and payment means. Since 2014, developers have paid more and more attention to solving deficiencies of bitcoin in terms of technology and scalability. In late 2013, Vitalik Buterin released an Ethereum white paper, "Ethereum: A next-generation smart contract and decentralized application platform", which introduced smart contracts into the blockchain and opened the application of the blockchain outside the monetary field, thus opening the era of Blockchain 2.0.

A smart contract is a computerized protocol that can automatically execute based on specified trigger rules, and can also be regarded as a digital version of a traditional contract. The concept of the smart contract is first proposed in 1994 by Nick Szabo, an interdisciplinary legal scholar and cryptography researcher. This technology was once not used in the practical industry due to the lack of programmable digital systems and related technology, until the emergence of blockchain technology and Ethereum which provided a secure execution environment. Due to a blockchain-type ledger adopted by the blockchain technology, generated data cannot be tampered with or deleted, and the entire ledger will continuously add ledger data, thus ensuring traceability of historical data; moreover, the decentralized operation mechanism avoids the influence of centralized factors. Smart contracts based on the blockchain technology can not only give full play to advantages of the smart contracts in terms of cost and efficiency, but also avoid interference of malicious acts on normal execution of contracts. The smart contract is written into the blockchain in a digital form, and the characteristics of the blockchain technology ensure that the whole process of storage, reading and execution is transparent, traceable and cannot be tampered with.

The smart contract is essentially a program that can be executed by a computer. Like computer programs widely used now, smart contracts can be written in high-level languages (such as C language, C++ language, etc.). A program code of a smart contract written in high-level languages can generally be converted into "a machine code" that can be recognized and run by a CPU of the computer through a "compiler", and then such machine code (or "microprocessor instruction") can be executed by the CPU. This mode is generally called "compilation execution".

The compilation execution is generally not scalable across platforms. Because there are different manufacturers, different brands and different generations of CPUs, instruction sets supported by these different CPUs in many cases are different, such as x86 instruction set, ARM instruction set, etc., and the instruction sets supported by CPUs of different generations but the same manufacturer and the same brand (such as different generations of Intel CPUs) are not exactly the same. Therefore, the same program code written in the same high-level language may be converted into different machine codes by compilers on different CPUs. Specifically, in a process of converting a program code written in high-level languages into a machine code, a compiler will optimize in combination with the characteristics of specific CPU instruction sets (such as vector instruction sets, etc.) to improve the speed of program execution, and such optimization is often related to specific CPU hardware. In this way, the same machine code can be run on x86, but may not be able to run on ARM; even for the same x86 platform, with the passage of time, the instruction set is constantly enriched and extended, which leads to that machine codes run on different generations of x86 platforms are different. Moreover, because the execution of a machine code needs the CPU to be scheduled by an operating system kernel, even with the same hardware, the machine codes supported to be run under different operating systems may be different.

Different from the compilation execution, there is also a program operation mode of "interpretation execution". For example, the Java language compiles a Java source code into a standard bytecode through a Java compiler, where the compiler is not aimed at an instruction set of any actual hardware processor, but defines a set of abstract standard instruction sets. The compiled standard bytecode generally cannot be run directly on a hardware CPU, so a virtual machine, namely JVM, is introduced, which runs on a specific hardware processor to interpret and execute the compiled standard bytecode.

JVM is the abbreviation of Java Virtual Machine, which is a kind of fictional computer, and usually can be realized by simulating various computer functions on actual computers. JVM shields information related to specific hardware platforms, operating systems, etc., so that Java programs can be run on a plurality of platforms without modification only by generating a standard bytecode that can be run on Java virtual machines.

A very important feature of the Java language is platform irrelevance. And using the Java virtual machines is the key to realize this feature. If a general high-level language is to be run on different platforms, the high-level language at least needs to be compiled into different target codes. After the introduction of the Java language virtual machine, the Java language does not need to be recompiled when it is to be run on different platforms. The Java language shields information related to specific platforms by using the Java virtual machine, so that a Java language compilation program can be run on various platforms without modification only by generating a target code (a bytecode) run on the Java virtual machine. When the Java virtual machine executes the bytecode, the Java virtual machine interprets the bytecode as a machine instruction on a specific platform to execute. This is why Java can be written once and run anywhere.

JVM runs on a specific hardware processor and is responsible for interpreting and executing a bytecode for the specific processor the JVM runs, shielding these underlying differences upward and presenting to developers with standard development specifications. When the JVM executes a bytecode, the JVM actually finally interprets the bytecode as a machine instruction on a specific platform to execute. Specifically, after receiving an input bytecode, the JVM interprets each instruction in the bytecode one by one and translates the instruction into a machine code suitable for the current machine to run. These processes are interpreted and executed by an Interpreter for example. In this way, developers who write Java programs do not need to consider which kind of hardware platform the written program code will be run on. The development of the JVM is accomplished by professional developers in Java organization to adapt the JVM to different processor architectures. Up to now, there are only a limited number of mainstream processor architectures, such as X86, ARM, RISC-V, and MIPS. After professional developers respectively port the JVM to platforms that support the specific hardware, Java programs can theoretically be run on all machines. The migration of the JVM is usually provided by professionals in Java development organization, which greatly reduces the burden on Java application developers.

The interpretation execution brings cross-platform portability, but because the execution of a bytecode goes through the process of JVM intermediate translation, the execution efficiency is not as high as the above-mentioned compilation execution efficiency, and the difference in efficiency can sometimes even reach dozens of times.

FIG. 1 shows similarities and differences between compilation execution and interpretation execution. For both interpretation execution and compilation execution, or both a physical machine and a virtual machine, it is impossible for a machine to read and understand an application program like a human, and then acquire the ability to execute. Most of program codes, before becoming into the target code of the physical machine or an instruction set which can be executed by the virtual machine, need to go through all the steps in FIG. 1. In FIG. 1, the branch from the top to the left is a generation process from a program code to a target machine code in traditional compilation principle, and the branch from the top to the right is a process of interpretation execution. Nowadays, most languages based on physical machines, Java virtual machines, or other High-Level Language Virtual Machines (HLLVMs) that are not Java will follow this idea based on modern classical compilation principles. Before execution, the program source code is processed with lexical analysis and syntax analysis first to convert the source code into an Abstract Syntax Tree (AST). For the implementation of a specific language, lexical analysis, syntax analysis and even the following optimizer and target code generator can be selected to be independent of an execution engine to form a complete compiler to implement, which is represented by C or C++ language. Or, some of these steps (such as those steps before generating the AST) can be chosen to implement as a semi-independent compiler, which is represented by Java language. Or all these steps and the execution engine are concentrated encapsulated in a closed black box, such as most JavaScript executors.

In order to balance cross-platform portability and high performance as much as possible, the concept of Just-In-Time Compiler (JIT) was proposed. The core idea of the JIT is "how to efficiently avoid repetitive work of interpreting instructions". There are a large number of repeatedly executed codes in computer programs. For example, some computing "functions" may be called many times by a loop during the execution of a program. If it is interpretation execution, each execution of the loop process will translate this function from a bytecode to a machine code. However, the actual situation is that the machine code generated by this function in dozens of translations is exactly the same. Naturally, if after the first translation, the machine code of the translated function is cached, and in the subsequent re-execution process, the cached code is directly used instead of re-translation, the execution efficiency can be improved.

On the contrary, some functions are executed only once during a program running cycle (for example, boot initialization), then such functions do not need to be cached and can be directly interpretation executed once. Therefore, a core module in JIT technology is "hotspot analysis", that is, analyze which codes are executed many times in the process of program execution, so as to cache translated machine code of the codes. For operations with less number of execution, caching is not needed. In this way, a best balance between execution efficiency and memory overhead can be achieved.

In addition, another core module in the JIT technology is compilation optimization (or optimized compilation). Directly translated machine codes are not optimized in conjunction with the context, and only high-frequency machine codes are cached, which is limited in performance improvement. For better performance, further optimizations can be made to a compiler. The way of compilation optimization generally takes relatively more time to implement.

Figure 2:
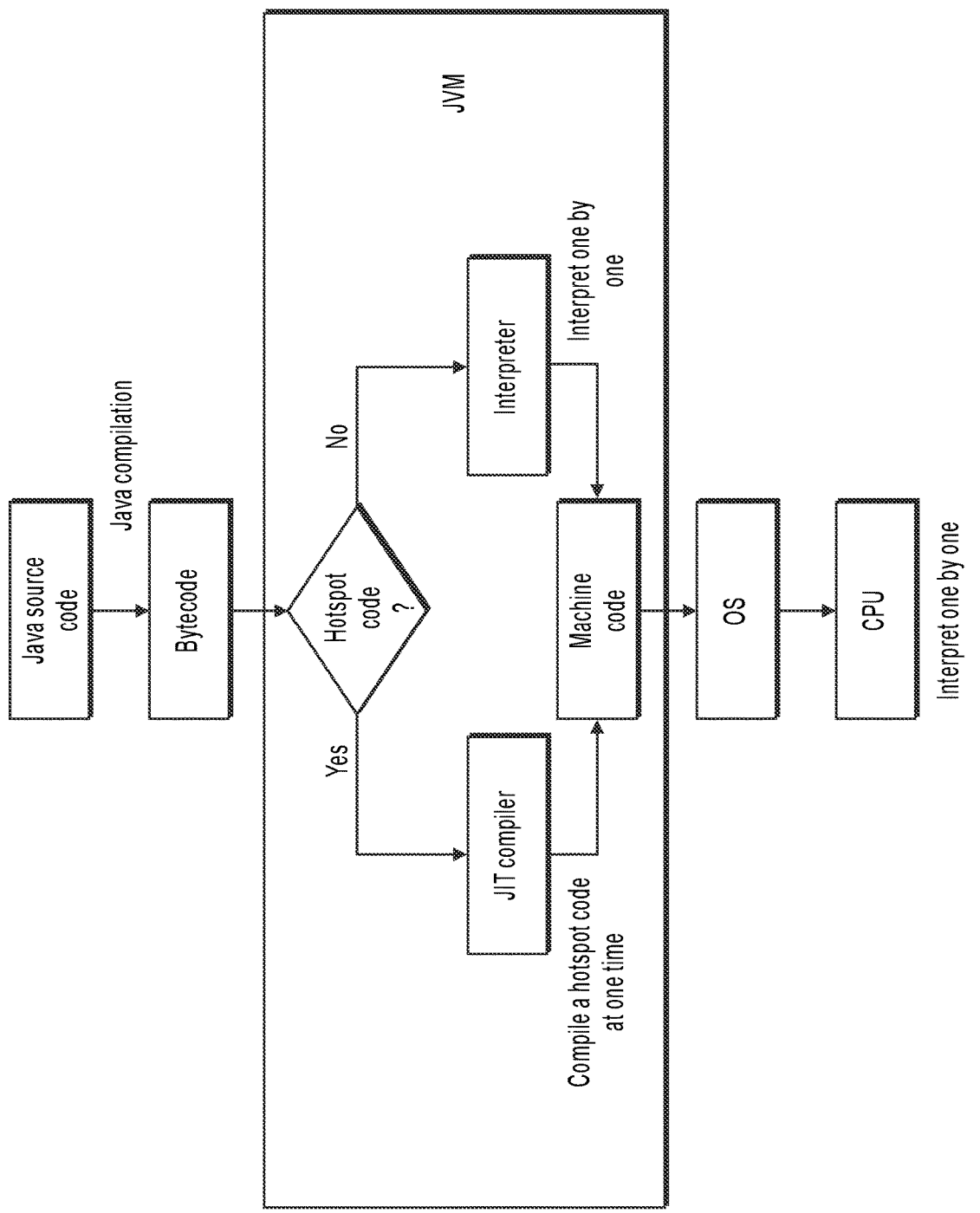
FIG. 2 is a schematic diagram of interpretation execution and JIT compilation according to one embodiment.

The working principle of the JIT is, for example, shown in FIG. 2. A Java source code is compiled by a Java compiler to generate a piece of Java bytecode, which is distributed to two execution paths (JIT Compiler and Interpreter) after hotspot analysis. A code judged as a hotspot (high frequency execution) is compiled in a JIT compiler to obtain a machine code, the machine code is cached and executed, which is generally executed by a CPU under the control of an Operating System (OS). A code with low frequency accesses the Interpreter, where the code is translated into a machine code and then executed by the CPU under the control of the OS.

Due to the correlation of backward and forward of the program code, there is often a large space for optimization in the compilation process. The execution efficiency of optimized machine code will be much higher than that of directly translated machine code. If better performance is to be obtained, optimization of a compiler is necessary. The compilation process of the JIT Compiler may be time consuming. In particular, the JIT Compiler may take a long time to compile the bytecode for the first time, which is even worse than the interpretation execution. Then, for some java programs, if the hotspots are not very prominent, i.e. none of respective execution frequencies is very high, while the overall execution flow is long, it is difficult for the JIT to take advantage of the compilation execution.

Figure 8:
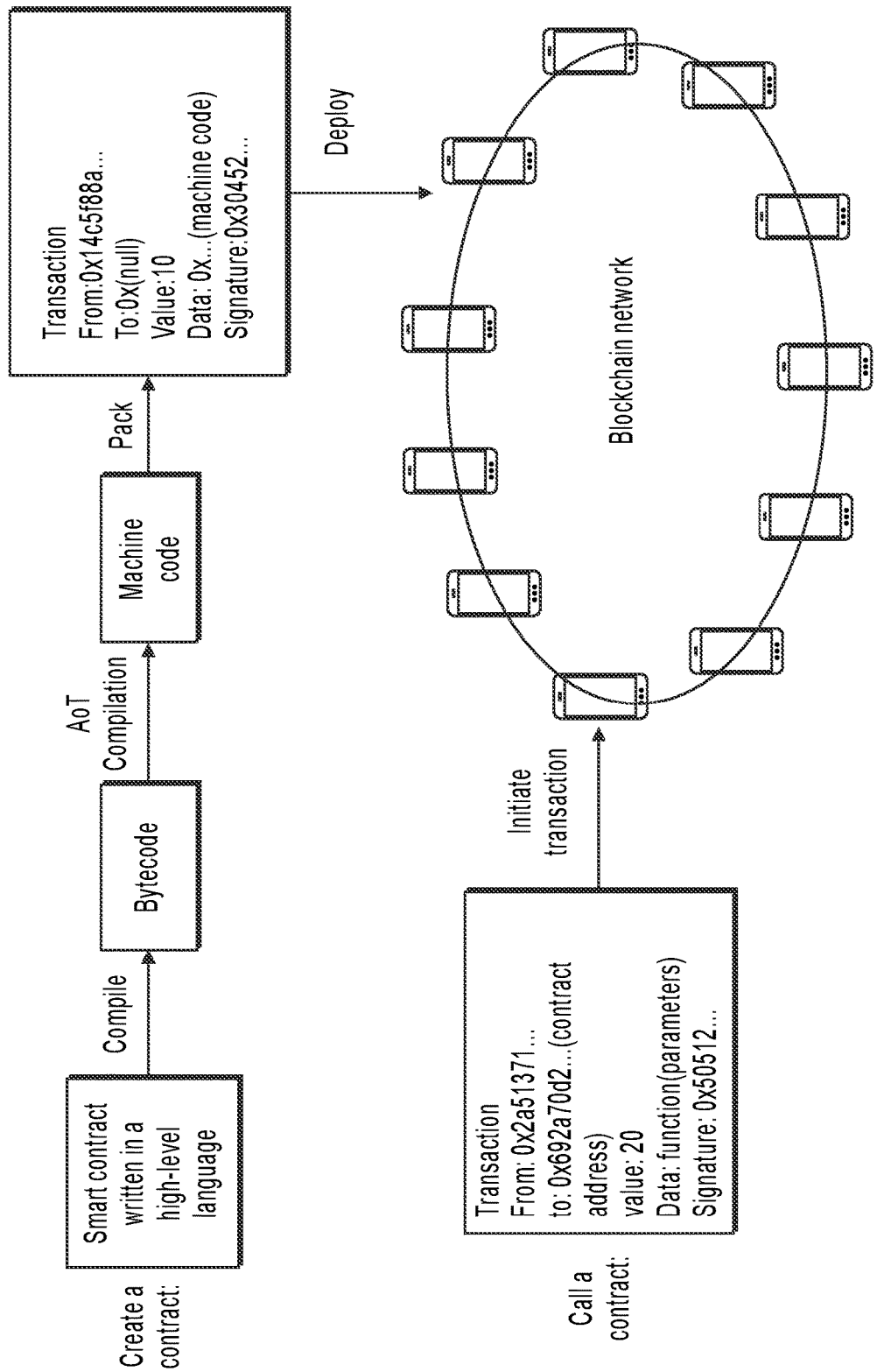
FIG. 8 is a schematic diagram of the creation and invoking of a smart contract according to one embodiment.

In addition, another idea is put forward, that is, AoT (Ahead of Time). AoT is equivalent to a pre-compiled execution way. Before a program is run, a bytecode is compiled once for a target execution environment to obtain a machine code, which is then deployed to a target machine for execution, such as the process shown in FIG. 8. AoT can run as efficiently as compilation execution, but during the AoT, it is necessary to clearly know the hardware, the instruction set architecture and the system, etc. of a target system to ensure that the compiled code can be run. Furthermore, generally speaking, for instructions with the same function, the amount of statements needed to express in a machine code is greater than in a bytecode, and much greater than in a code written in a high-level language, in this way, for a program with the same content, it is likely that a size of the machine code>a size of the bytecode>a size of the high-level language code. The bytecode can be compiled into a machine code by AoT, in a case that the hardware, the instruction set architecture and the system, etc. of the target system are clearly known. Moreover, the machine codes for different classes of target systems are different, so it may be necessary to provide different versions of machine codes so that there can be corresponding correctly executed machine codes on the various target systems. In this way, a total size of the machine code will generally be larger than that of the bytecode or the high-level language code.

For example, Android uses the Dalvik virtual machine before version 5.0, and uses the ART virtual machine after the version 5.0. The Dalvik uses a JIT compiler to interpret a bytecode, while the ART uses an AoT mechanism. The ART manner pre-compiles a bytecode (the installation process of an Android App is actually installing the bytecode of a program) to a machine code at the time of installing an App. After removing the process of interpreting code, applications on the Android can be executed more efficiently and started faster.

As a decentralized distributed system, the blockchain needs to maintain distributed consistency. Specifically, for a set of nodes in a distributed system, each node has a built-in state machine. Each state machine needs to execute the same instructions in the same order from the same initial state, and keep each change of state the same, thus ensuring that a consistent state is eventually reached. However, it is difficult for all node devices participating in the same blockchain network to have the same hardware configuration and software environment. Therefore, in Ethereum which is the representative of Blockchain 2.0, a virtual machine similar to the JVM, the Ethereum Virtual Machine (EVM), is used in order to ensure that the process and result of executing smart contracts are the same on each node. The differences in hardware configuration and software environment of each node can be shielded with the EVM. In this way, a developer can develop a set of code for a smart contract and upload the compiled bytecode to the blockchain after the code of the smart contract is compiled locally by the developer. When each node interprets and executes the same bytecode through the same EVM with the same initial state, the node can obtain the same final result and the same intermediate result, and can shield the differences of underlying hardware and environmental between different nodes. In this way, the emergence of decentralized blockchain technology enables the implementation of the smart contracts proposed as early as 1994, and, because the implementation of decentralization inevitably faces differences in the hardware and operating environment of different execution machines, furthermore, the smart contracts are processed in a way of interpretation execution to ensure that the same execution results can be obtained on decentralized machines with different hardware and operating environment.

The EVM is a Turing complete virtual machine, which means that various complex logics can be implemented through the EVM. This is also one of the biggest improvements of the Ethereum as a representative of the Blockchain 2.0 over the Blockchain 1.0. A smart contract that the users publish or invoke in the Ethereum can be run on the EVM. As mentioned earlier, the EVM directly runs a bytecode, and smart contracts deployed on the blockchain can be in a form of the bytecode.

Figure 3:
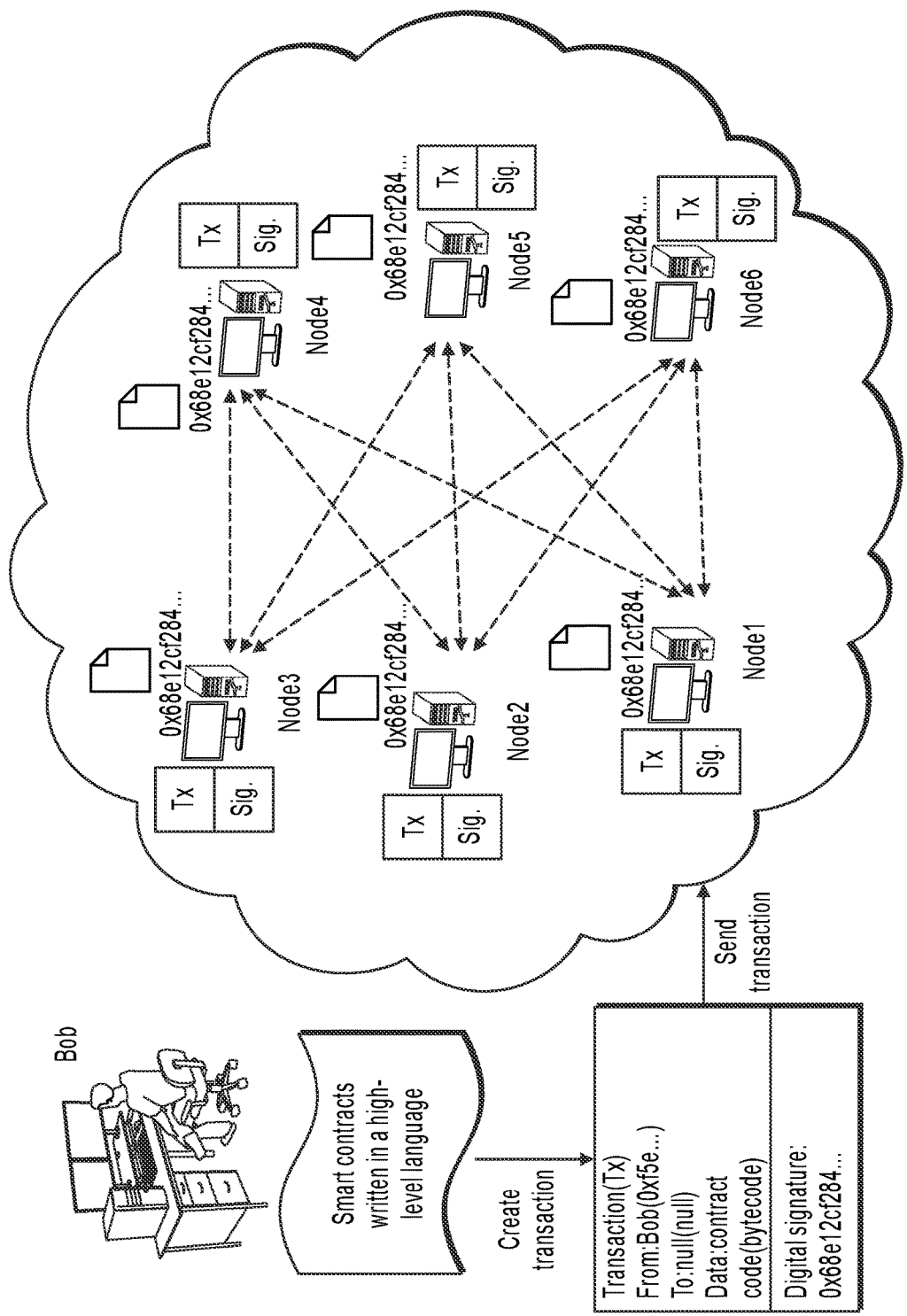
FIG. 3 is an illustrative process of creating a smart contract according to one embodiment.

As shown in FIG. 3, after Bob sends a transaction containing information about the creation of a smart contract to the Ethereum network, an EVM of node 1 can execute the transaction and generate a corresponding contract instance. In FIG. 3, the "data" field of the transaction can hold a bytecode, and the "to" field of the transaction can be a null address. Once the nodes reach an agreement through a consensus mechanism, the contract is successfully created and can be invoked by users subsequently.

When the contract is created, a contract account corresponding to the smart contract appears on the blockchain, which has a specific address, and a contract code and an account storage can be stored in the contract account. The behavior of the smart contract is controlled by the contract code, while the account storage of the smart contract holds a state of the contract. In other words, the smart contract enables the creation of a virtual account containing the contract code and the account storage on the blockchain.

As mentioned above, the "data" field which includes the transaction for creating a smart contract can hold a bytecode of the smart contract. The bytecode includes a sequence of bytes, and each of which can indicate an operation. Instead of writing the bytecode directly, developers can choose a high-level language to write a smart contract code, based on various considerations such as development efficiency and readability, etc. The smart contract code written in the high-level language is compiled by a compiler to generate a bytecode, and then the bytecode can be deployed on the blockchain. There are many high-level languages supported by the Ethereum, such as Solidity, Serpent, LLL language, etc.

Taking the Solidity language as an example, a contract written in the Solidity language is very similar to a Class in the object-oriented programming language, and a variety of members can be declared in one contract, including state variables, functions, function modifiers, events, etc. The state variables are values permanently stored in the account storage of the smart contract and are used to save the state of the contract.

The following is a code example 1 of a simple smart contract written in the Solidity language:

```
Contract Example{
    int balance;
    function C( ){
        balance + = 1;
    }
    function getbalance( ) returns(int){
        return balance ;
    }
}
```

Generally, when the contract is deployed on the blockchain, the state variable "balance" can be a kind of asset type newly defined in the contract. The function C( ) can define a change operation of the "balance", and the function getbalance( ) returns(int) can define an operation that gets the current value of the "balance" and returns.

Figure 4:
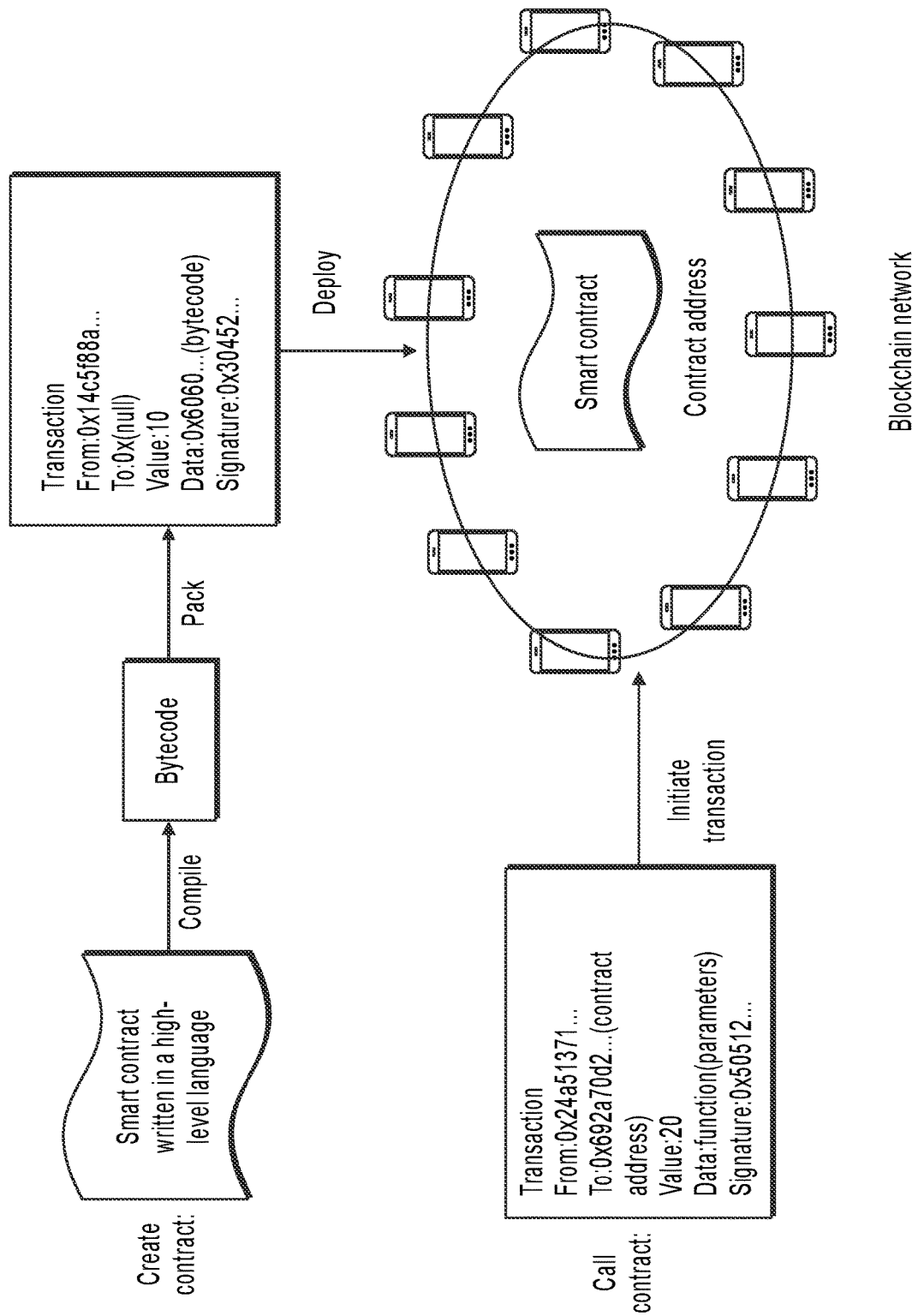
FIG. 4 is an illustrative process of invoking a smart contract according to one embodiment.

Furthermore, as shown in FIG. 4, still using the Ethereum as an example, after Bob sends a transaction containing information about invoking a smart contract to the Ethereum network, the EVM of node 1 can execute the transaction and generate a corresponding contract instance. In FIG. 4, the "from" field of the transaction indicates the address of the account that initiated the invoking of the smart contract, the "0x692a70d2 . . . " in the "to" field represents the address of the smart contract being invoked, the "value" field indicates the value of Ethers in the Ethereum, and the "data" field of the transaction holds methods and parameters for invoking the smart contract. The value of the "balance" may change when the smart contract is invoked. Subsequently, a client device can view the current value of the "balance" via a blockchain node.

Smart contracts can be executed independently at each node in the blockchain network in a predetermined manner, with all execution records and data stored on the blockchain, so that when a transaction is completed, a credential of the transaction that cannot be tampered with and will not be lost is stored on the blockchain.

Figure 5:
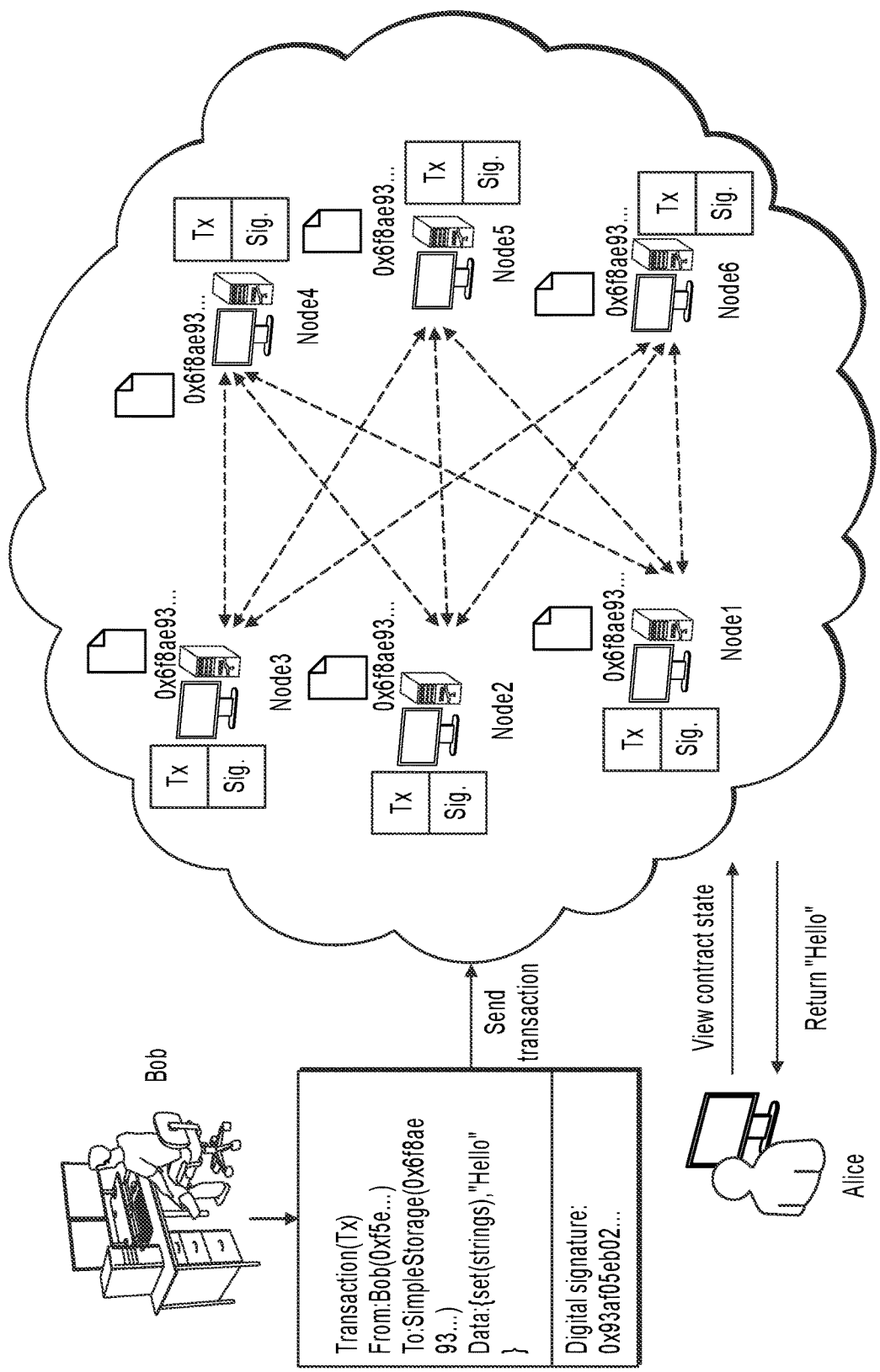
FIG. 5 is a schematic diagram of illustrating the creation and invoking of a smart contract according to one embodiment.

The diagram for creating a smart contract and invoking the smart contract is shown in FIG. 5. To create a smart contract in the Ethereum, the process of writing the smart contract, turning into a bytecode (e.g. compiled into a Bytecode by a compilation tool such as Solc or C++, etc.), and deploying to the blockchain, etc. needed to be gone through. Invoking a smart contract in the Ethereum indicates initiating a transaction that points to the address of the smart contract (the address of the smart contract can be pointed to via the "to" field in the transaction), and a smart contract code is run distributed in a virtual machine of each node in the Ethereum network.

Figure 9:
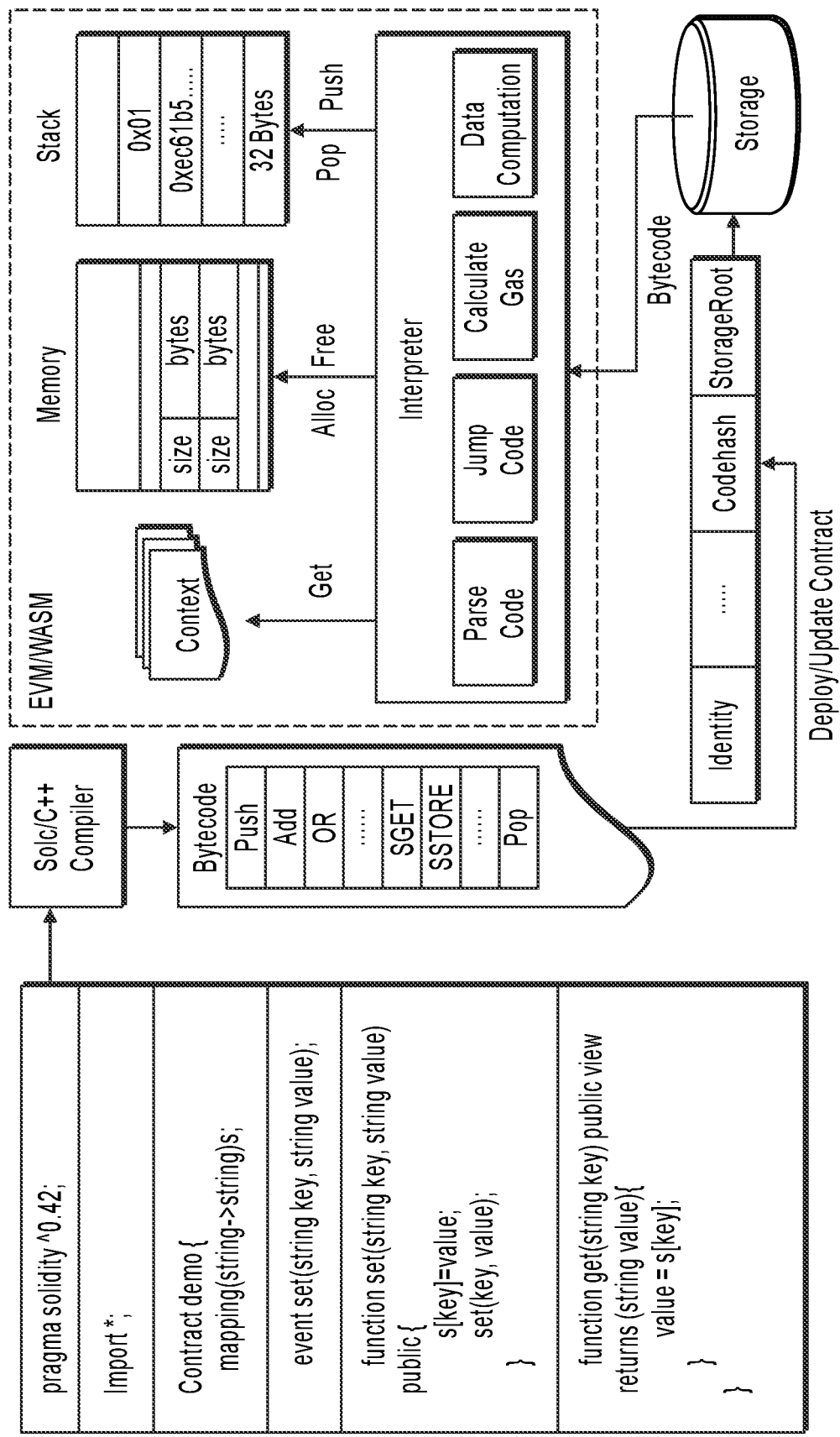
FIG. 9 is a schematic diagram of an execution process of a virtual machine included in the process of creating and invoking a smart contract according to one embodiment.

The transaction of creating the smart contract is sent to the blockchain, and after consensus, the nodes of the blockchain can execute the transaction. Specifically, it could be the EVM or WASM of the blockchain node that performs this transaction. As mentioned earlier, at this time, a contract account corresponding to the smart contract (including, for example, an identity of the account, a hash value of the contract Codehash, and a root of contract storage Storage-Root) appears on the blockchain, the contract account has a specific address, and the contract code and the account storage can be held in the Storage of the contract account, as shown in FIG. 9. The behavior of the smart contract is controlled by the contract code, while the account storage of the smart contract holds the state of the contract. In other words, smart contracts enable virtual accounts containing a contract code and an account storage to be created on the blockchain. The Codehash value can be generated or changed for contract deployment transactions or contract update transactions. Subsequently, the blockchain node can receive a transaction request for invoking the deployed smart contract, which can include the address of the invoked contract, the function in the invoked contract, and input parameters. Generally, when the transaction request has past a consensus, each node of the blockchain can independently execute the smart contract designated for invoking. Specifically, as shown in FIG. 9, the node can load a bytecode of the contract from the Storage into the virtual machine (EVM or WASM) based on the address of the contract; then, the bytecode is interpreted and executed by the Interpreter, which includes, for example, parsing the bytecode of the invoked contract to obtain OPcodes and storing these OPcodes in Memory of the virtual machine, at the same time the address of the invoked function can be obtained; when the amount of Gas needed to execute the contract is calculated and the Gas is enough, the corresponding address in the Memory is jumped to for obtaining the OPcode of the invoked function and starting to execute, and operations such as Data Computation and Push/Pop in Stack and the like are performed on the data operated by the OPcode of the invoked function, so as to complete the data computation. This process may also need some information about the Context of the contract, such as the block number, information of an initiator that invokes the contract, and the like, which can be got from the Context (Get operation). Finally, the generated state is stored in the Storage by invoking a storage interface. It should be noted that the process of creating a contract may generate interpretation execution of certain functions in the contract, such as functions for initialization operations, which will also parse codes, generate jump instructions, store in the Memory, operate data in the Stack, etc. In the above-mentioned interpretation execution process, generally speaking, functions that are repeatedly executed are not cached, and even for functions that are executed many times, the virtual machine needs to repeat the parsing and executing process as well.

Figures 1, 6:
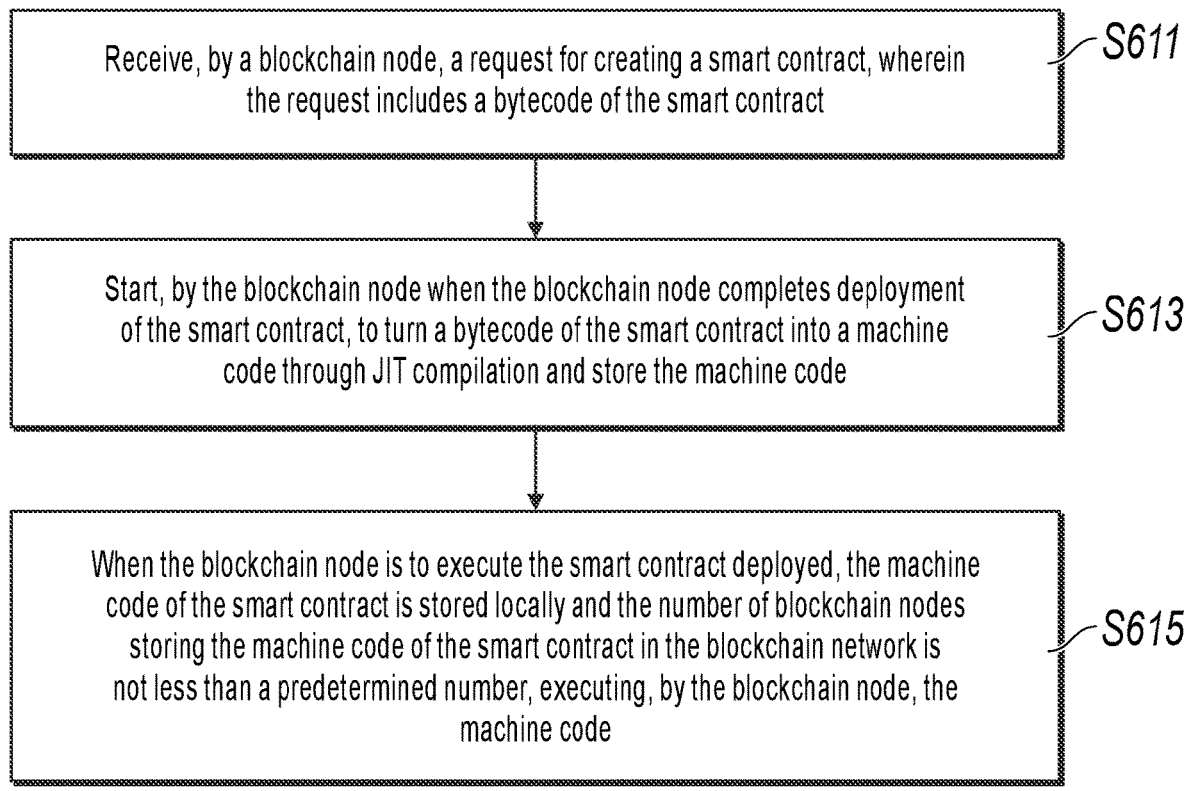
Figures 2, 6:
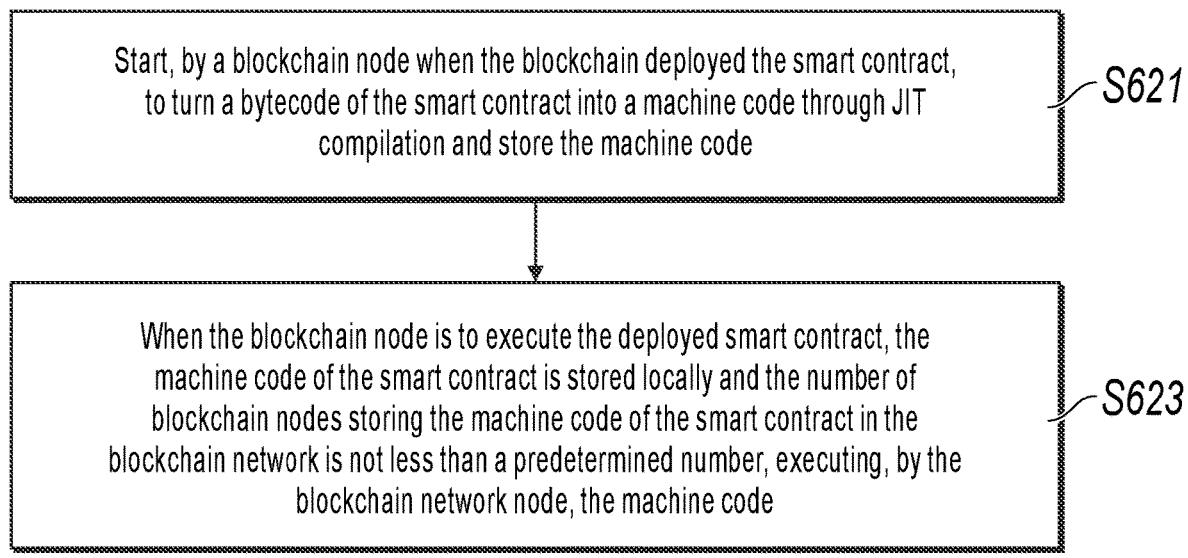

As mentioned earlier, the JVM has the advantages of cross-platform portability and the need to improve performance. Similarly, the EVM in the blockchain can also use technology such as the JIT and the AoT to improve the performance of executing a smart contract. Provided in the present specification is an embodiment of a method of executing a smart contract, as shown in FIG. 6-1, including:

S611: receiving, by a blockchain node, a request for creating a smart contract, where the request includes a bytecode of the smart contract.

A user can write smart contracts in a high-level language locally. The written smart contract can be compiled by a compiler to get a bytecode. Then the bytecode of the compiled smart contract can be packaged into a transaction and sent to a blockchain network via a client device. For example, the format of a transaction is shown in FIGS. 3 to 5, where the bytecode of the smart contract that needs to be created can be held in the "data" field of the transaction.

The users can also write smart contracts in high-level languages directly on a first blockchain node, which can also compile the smart contracts written in the high-level languages by using a compiler to generate a bytecode.

S613: starting, by the blockchain node when the blockchain node completes deployment of the smart contract, to turn a bytecode of the smart contract into a machine code through JIT compilation and store the machine code.

In Ethereum, and public chain, consortium chain or private chain systems with similar principles, blockchain nodes can initiate a consensus on a batch of transactions. The batch of transactions can include a transaction for creating a smart contract as described above. After reaching a consensus, generally, each consensus node locally stores a bytecode of the smart contract to be created. Each consensus node can locally execute the transaction for creating the smart contract, and create a corresponding contract account; and create an address for the smart contract account based on the same rules, and the addresses created by each consensus node for the same contract are the same. In this way, the deployment of the contract is completed.

When the blockchain node completes the creation of the smart contract, i.e., when the smart contract is deployed, the blockchain node can start to turn a bytecode of the smart contract into a machine code through JIT compilation and store the machine code. When the blockchain node completes the creation of the smart contract, the blockchain node can immediately start to perform JIT compilation on the bytecode of the smart contract. This is because, when the smart contract is deployed, there may be service requests initiated to invoke the deployed smart contract soon. In addition, JIT needs to spend relatively more system resources and time, and allocating system resources to perform JIT when the service load of the blockchain node is heavy will affect service processing; therefore, the blockchain node can also use relatively free periods of time to perform JIT compilation on the bytecode of the smart contract, thus reducing or avoiding the impact on service processing. Furthermore, when the blockchain node completes the creation of the smart contract, or when the blockchain node receives a transaction request for invoking the smart contract created, the blockchain node performs JIT compilation on the bytecode of the smart contract.

Each node of the blockchain locally performs JIT compilation on the bytecode of the same smart contract. Each node only needs to adjust based on processor architecture, run environment, etc. of the node itself, instead of compiling a plurality of different versions of machine codes. In this way, the size of machine codes stored on the node device can be reduced significantly, thus reducing the storage overhead.

Preferably, the storing is caching, and by caching to the memory, responses can be made more quickly later. Specifically, the memory can be a cache area allocated in a virtual machine. Of course, even if storing to a disk, the response speed can be improved to some extent in many cases.

An EVM in the blockchain uses JIT technology to improve performance during smart contract execution, which specifically can include the following steps:

First, identifying a hotspot code during the process of translating and/or executing the bytecode of the smart contract, for example, by counting the number of execution via the code counter of the JIT engine, thus analyzing which bytecodes are executed multiple times and thus caching the translated machine code of the analyzed bytecode. While for operations with a relative smaller number of execution, caching is not necessary. In this way, a best balance between execution efficiency and memory overhead can be achieved. By identifying and caching the hotspot code, it allows, for a plurality of executions of a bytecode and except that translation is performed in the first execution, to use the cached machine code directly in a subsequent execution, and eliminate the process of translating the bytecode again, thereby reducing the time. The granularity identifying the number of execution can be at a function level or at a code block level. In general, a code block may be a part of a function or the code block may include several functions.

Second, further optimizations can be made in the JIT compilation, which combines correlation of backward and forward of the program code to compile and caches the optimized compiled machine code for use in subsequent invoking. The compiled and optimized machine code will generally execute more efficiently than directly translated machine code. On the one hand, the JIT engine can take with information of the hardware and environment of the blockchain node executing the compilation, thus making the compiled machine code with optimizations of hardware+ environment, which can specifically include optimizations during the process of generating a machine code, including instruction-level optimizations, register allocation and optimizations, etc. On the other hand, the JIT engine can analyze context information, such as branch jump statements executed in current function, to identify which of these statements is the most likely to jump, thereby adjusting this most likely jump statement to the top, such that there can be a higher probability of hitting the statement in that branch first during execution; the compiler optimization process can also perform dead code elimination through data flow analysis and/or active variable analysis, e.g. eliminating branches that will not be reached, in addition, the compiler optimization process can include optimization of loop statements, common word expression substitution, etc.

S615: when the blockchain node is to execute the smart contract deployed, the machine code of the smart contract is stored locally, and the number of blockchain nodes storing the machine code of the smart contract in a blockchain network is not less than a predetermined number, executing, by the blockchain node, the machine code.

When the deployment of the smart contract is completed, invoking of the contract can be provided. In this way, a client device (which may be different from the client device that initiated the transaction to create a contract in S611) can initiate the invoking of the contract. For example, the client device initiates a transaction where the "to" field contains the address of the above-mentioned deployed smart contract, and the "data" field can include the input parameters and the methods of the invoked contract, thus enabling the invoking of the smart contract deployed. In general, after a batch of transactions, including the transaction that invokes the contract, pass a consensus, each consensus node executes the transactions separately.

In a case of executing the smart contract deployed, the blockchain node can first check whether a machine code of the invoked contract exists locally. If the machine code exists, it means that a bytecode of the smart contract has been performed JIT-compilation locally. And then if it can be determined that the number of blockchain nodes storing the machine code in the blockchain network is not less than a predetermined number, the blockchain node can directly execute the machine code corresponding to the invoked function and/or code block in the smart contract and enter the input parameters indicated by the above-mentioned "data" field. When the number of blockchain nodes in the blockchain network is not less than 3f+1, the predetermined number is not less than 2f+1, and the f is a positive integer, thus ensuring that the number of blockchain nodes not storing the machine code is not greater than the f. Then even if these blockchain nodes not storing the machine code interpret and execute the bytecode of the smart contract, and the execution result of the interpretation and execution against the bytecode is different from the execution result against the machine code, the occurrence of blockchain forks can be avoided, and the stability of the blockchain can be ensured.

Of course, in some scenarios with relative stringent conditions, the above predetermined number can be set to the total number of blockchain nodes in the blockchain network, such that the machine code will only be executed uniformly by each blockchain node if all blockchain nodes store the machine code, which ensuring consistency in the execution results obtained on all blockchain nodes.

The blockchain nodes in the blockchain network can determine the blockchain transactions and the order of transactions, etc. for the present round of ledger through a consensus mechanism. Then, when each blockchain is to reach a consensus on the transaction invoking the smart contract deployed, the blockchain node can separately report the compilation progress of the local JIT compilation against the smart contract deployed to the other blockchain nodes in the blockchain network. Therefore, by improving the consensus mechanism (i.e., adding the above-mentioned reporting operation for the compilation progress), each blockchain node can obtain the compilation progress reported by the other blockchain nodes based on the consensus, and combine the compilation progress reported by the other blockchain nodes with the compilation progress of the blockchain node, to determine the compilation progress of all blockchain nodes, so as to know the number of blockchain nodes storing the machine code in the blockchain network.

The technical solutions in the present specification can be applied to various types of consensus mechanisms in related technology, such as POW (Proof of Work) mechanism, POS (Proof of Stake) mechanism, PBFT (Practical Byzantine Fault Tolerance) mechanism, etc.

Taking the PBFT mechanism as an example, the consensus process is divided into a total of 3 phases, i.e., a pre-prepare phase, a prepare phase and a commit phase; meanwhile, a blockchain node in the blockchain network is set or elected as a master node and the rest of the blockchain nodes as slave nodes. Then, in the pre-prepare phase, the above-mentioned master node multicasts or broadcasts a pre-prepare message to all slave nodes, which contains a blockchain transaction that the master node proposes to upload, and if the blockchain transaction is the above-mentioned transaction invoking the smart contract deployed, the pre-prepare message can also carry the JIT compilation progress of the master node for the bytecode of the smart contract, so that all slave nodes can be informed of the compilation progress of the master node. Then, in the prepare phase, each slave node that receives the pre-prepare message multicasts or broadcasts a prepare message to the other blockchain nodes separately, and each prepare message contains the JIT compilation progress of the slave node as the sender for the bytecode of the smart contract. Then, after the pre-prepare and prepare phases described above, each blockchain node can be informed of the compilation progress of the other blockchain nodes, and by combining with compilation progress of the blockchain node, determine the number of blockchain nodes storing the machine code in the blockchain network.

In addition to the above-mentioned way of combining the pre-prepare phase with the prepare phase, which allows blockchain nodes to report the compilation progress to each other, the commit phase can also be used to complete the reporting operation. For example, after the prepare phase described above, each blockchain node (including the master node and the slave node) multicasts or broadcasts a commit message to the other blockchain nodes separately, and each commit message can contain the JIT compilation progress of the blockchain node as the sender for the bytecode of the smart contract. Then, after the commit phase described above, each blockchain node can be informed of the compilation progress of the other blockchain nodes, and by combining with compilation progress of the blockchain node, determine the number of blockchain nodes storing the machine code in the blockchain network.

In a case where the machine code of the smart contract is stored, the blockchain node can significantly increase the speed of executing the smart contract because the machine code is directly executable by the CPU (under the control of the OS). Furthermore, the situation where the machine code of the smart contract is cached in the memory can further increase the speed of executing the smart contract. Of course, even if the machine code of the smart contract is stored on a disk, the execution speed can also be improved to a certain extent.

Executing the machine code by the blockchain node can specifically indicate executing a machine code corresponding to the invoked function and/or the code block in the smart contract stored.

Furthermore, when the blockchain node is to execute the smart contract deployed, no machine code of the smart contract is stored locally, the blockchain node can interpret and execute the bytecode of the smart contract deployed without waiting for the completion of JIT compilation. If the number of blockchain nodes storing the machine code at this point does not reach the predetermined number mentioned above, then all blockchain nodes in the blockchain network can interpret and execute the bytecode, which can also ensure that execution results of these blockchain nodes are consistent. In order to respond to service requests in a timely manner, i.e., to quickly respond to service requests that initiate the invoking of a smart contract deployed, a blockchain node can first query whether a machine code of the invoked smart contract exists, and if so, it indicates JIT compilation has been completed; if not, it indicates that JIT compilation has not been started or completed. If the machine code is available, as previously described, a blockchain node which is to execute the smart contract deployed can execute the machine code, thus allowing for a significant increase in the speed of executing the smart contract. If no machine code is available, the blockchain node further queries the current status of JIT compilation for the bytecode of the smart contract, which may specifically include two cases:

Case 1: when a blockchain node is to execute the smart contract deployed, no machine code of the smart contract is stored locally, the blockchain node further queries current status of JIT compilation for the bytecode of the smart contract, and in a case that the status is under JIT compilation, the bytecode of the smart contract is interpreted and executed by the blockchain node.

In a case that no machine code of the smart contract is stored locally, the blockchain node can query the current status of JIT compilation for the bytecode of the smart contract, and the query result can be under JIT compilation. For some service requests that invokes the smart contract, getting a fast response is the first choice, and this is the goal of blockchain systems of all kinds seeking to increase the number of transactions per second (TPS). For the case where the invoked smart contract is under JIT compilation, for a quick response, the blockchain node can interpret and execute the bytecode of the smart contract without waiting for the completion of JIT compilation.

Case 2: when a blockchain node is to execute the smart contract deployed, no machine code of the smart contract is stored locally, the blockchain node further queries current status of JIT compilation for the bytecode of the smart contract, and in a case that the JIT compilation is not started, then starting the JIT compilation, and interpreting and executing the bytecode of the smart contract by the blockchain node.

Similar to Case 1, for the case where the invoked smart contract not yet starts JIT, for a quick response, the blockchain node can interpret and execute the bytecode of the smart contract. Furthermore, for the case where JIT not yet starts, the blockchain node can start JIT compilation.

Interpreting and executing the bytecode of the smart contract by the blockchain node, can be by using an EVM to translate the bytecode of the smart contract one by one and execute the translated machine code line by line. In addition to the EVM, there are also Web Assembly (WASM) virtual machine and JavaScript Virtual Machine (JSVM), etc. The EVM is mainly taken as an example to illustrate herein.

The blockchain node, when completes JIT compilation of the smart contract, executes the storage operation on the compiled machine code. In this way, when the blockchain node is to execute the smart contract deployed, a JIT-compiled machine code of the invoked contract exists locally, it indicates that the JIT-compilation of the bytecode of the smart contract has been completed locally. And then the blockchain node can directly execute the JIT-compiled machine code corresponding to the function invoked in the smart contract and enter the input parameters indicated in the above-mentioned "data" field.

It should be noted that the blockchain node in S611 above, may differ from the blockchain nodes in S613 and S615. This is because, the blockchain as a distributed system, the nodes that receive transactions and the nodes that initiate consensus and execute transactions can be different nodes or, of course, the same nodes.

Another embodiment of a method of executing a smart contract in the present specification is described below in conjunction with FIG. 6-2, including:

S621: starting, by a blockchain node when the blockchain node deployed the smart contract, to turn a bytecode of the smart contract into a machine code through JIT compilation and store the machine code.

Starting, by the blockchain node when the blockchain node deployed the smart contract, to turn the bytecode of the smart contract into the machine code through JIT compilation can specifically include:

starting, by the blockchain node when the blockchain node completes the creation of the smart contract, to perform JIT compilation on the bytecode of the smart contract immediately; or, using, by the blockchain node when the blockchain node completes the creation of the smart contract, relatively free periods of time to perform JIT compilation on the bytecode of the smart contract; or performing, by the blockchain node when the blockchain node receives a transaction request to invoke the smart contract created, JIT compilation on the bytecode of the smart contract.

Turning the bytecode of the smart contract into the machine code through JIT compilation and storing the machine code includes:

identifying, by the blockchain node, in a process of translating and/or executing the bytecode of the smart contract, a hostpot bytecode, and performing compilation and storing;

and/or, performing, by the blockchain node, in the process of translating and/or executing the bytecode of the smart contract, optimized compilation on the bytecode and storing.

The granularity of identifying the hostpot bytecode includes a function level or a code block level.

S623: when the blockchain node is to execute the smart contract deployed, the machine code of the smart contract is stored locally, and the number of blockchain nodes storing the machine code of the smart contract in a blockchain network is not less than a predetermined number, executing, by the blockchain node, the machine code.

Executing, by the blockchain node, the machine code can be executing a machine code corresponding to an invoked function and/or a code block in the smart contract stored.

In addition, when the blockchain node is to execute the smart contract deployed, no machine code of the smart contract is stored locally, or the number of blockchain nodes storing the machine code in the blockchain network is less than the above-mentioned predetermined number, interpreting and executing, by the blockchain node, the bytecode of the smart contract. The number of blockchain nodes in the blockchain network is not less than 3f+1, the predetermined number is not less than 2f+1, and the f is a positive integer.

The blockchain node can report, when the blockchain node is to reach a consensus on a transaction invoking the smart contract deployed, the compilation progress of the local JIT compilation against the smart contract deployed to the other blockchain nodes in the blockchain network, and obtain compilation progress reported by the other blockchain nodes; then, the blockchain node determines whether all blockchain nodes in the blockchain network store the machine code corresponding to the bytecode of the smart contract based on the compilation progress of the blockchain node and the compilation progress reported by the other blockchain nodes.

Reporting, by the blockchain node when the blockchain node is to reach a consensus on the transaction invoking the smart contract deployed, the compilation progress of the local JIT compilation against the smart contract deployed to the other blockchain nodes in the blockchain network, includes:

if a consensus mechanism based on a practical Byzantine fault-tolerant (PBFT) algorithm is adopted, and the blockchain node is a master node, sending, by the blockchain node, a pre-prepare message to the other blockchain nodes in the pre-prepare phase, where the pre-prepare message contains the compilation progress of the blockchain node;

and if a consensus mechanism based on the PBFT algorithm is adopted, and the blockchain node is a slave node, sending, by the blockchain node, a prepare message to the other blockchain nodes in the prepare phase, where the prepare message contains the compilation progress of the blockchain node; and/or, if a consensus mechanism based on the PBFT algorithm is adopted, sending, by the blockchain node, a commit message to the other blockchain nodes in the commit phase, where the commit message contains the compilation progress of the blockchain node.

The specific way of the above-mentioned storing can be caching. By caching to the memory, responses can be made more quickly later. Of course, even if storing to a disk, the response speed can be improved to some extent in many cases.

Interpreting and executing, by the blockchain node, the bytecode of the smart contract, can include:

interpreting and executing, by the blockchain node, a bytecode corresponding to an invoked function in the smart contract.

When the blockchain node is to execute the smart contract deployed, no machine code of the smart contract is stored locally, interpreting and executing, by the blockchain node, the bytecode of the smart contract specifically can include:

when the blockchain node is to execute the smart contract deployed, no machine code of the smart contract is stored locally; further querying, by the blockchain node, current status of JIT compilation for the bytecode of the smart contract, and in a case that the status is under JIT compilation, interpreting and executing, by the blockchain node, the bytecode of the smart contract;

or, when the blockchain node is to execute the smart contract deployed, no machine code of the smart contract is stored locally; further querying, by the blockchain node, current status of JIT compilation for the bytecode of the smart contract, and in a case that the JIT compilation is not started, starting the JIT compilation, and interpreting and executing the bytecode of the smart contract.

Figure 7:
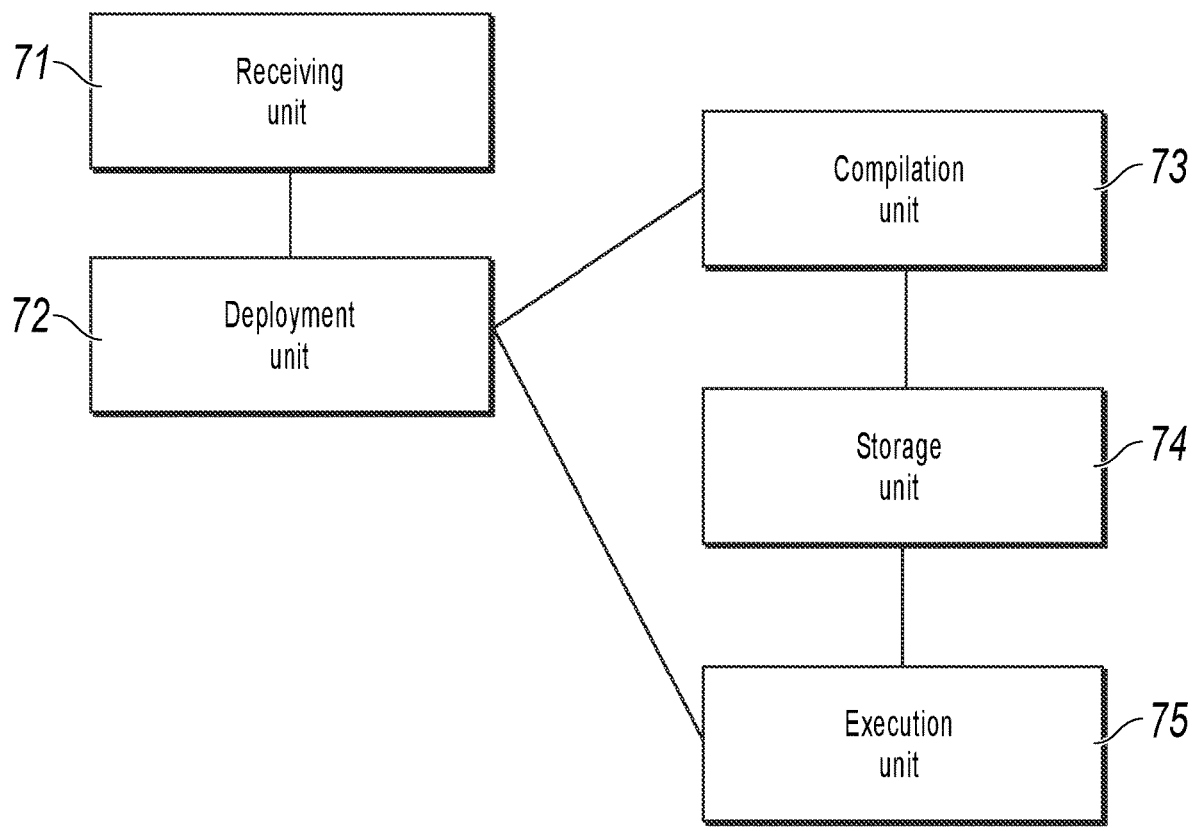
FIG. 7 is a block diagram of a blockchain node according to one embodiment.

The following describes an embodiment of a blockchain node for executing a smart contract of the present specification, as shown in FIG. 7, including:

a receiving unit 71, configured to receive a request for creating a smart contract, where the request includes a bytecode of the smart contract;

a deployment unit 72, configured to deploy the smart contract based on the request for creating the smart contract received by the receiving unit 71;

a compilation unit 73, configured to start to turn the bytecode of the smart contract into a machine code through JIT compilation when the deployment unit 72 completes the deployment;

a storage unit 74, configured to store the machine code compiled by the compilation unit 73; and an execution unit 75, when receiving invoking for the smart contract deployed, the storage unit 74 stores the machine code of the smart contract, and the number of blockchain nodes in a blockchain network storing the machine code is not less than a predetermined number, executes the machine code.

Starting, by the compilation unit 73, to turn the bytecode of the smart contract into the machine code through JIT compilation when the deployment unit 72 completes the deployment of the smart contract, specifically includes:

starting, by the compilation unit 73, to perform JIT compilation on the bytecode of the smart contract immediately when the deployment unit 72 completes the creation of the smart contract; or, using, by the compilation unit 73, relatively free periods of time to perform JIT compilation on the bytecode of the smart contract when the deployment unit 72 completes the creation of the smart contract; or performing, by the compilation unit 73, JIT compilation on the bytecode of the smart contract when the execution unit 75 receives a transaction request to invoke the smart contract created.

The storage unit 74 can be memory or disk storage.

Executing, by the execution unit 75, the machine code, includes: executing, by the execution unit 75, a machine code corresponding to the invoked function and/or code block in the smart contract stored.

When the execution unit 75 is to execute the smart contract deployed, no machine code of the smart contract is stored in the storage unit 74, or the number of blockchain nodes storing the machine code in the blockchain network is less than a predetermined number, interpreting and executing, by the execution unit 75, the bytecode of the smart contract.

Interpreting and executing, by the execution unit 75, the bytecode of the smart contract, includes:

interpreting and executing, by the execution unit 75, a bytecode corresponding to the invoked function in the smart contract.

When the deployment unit 72 is to execute the smart contract deployed, no machine code of the smart contract is stored in the storage unit 74, interpreting and executing, by the execution unit 75, the bytecode of the smart contract, specifically includes:

when the execution unit 75 is to execute the smart contract deployed, no machine code of the smart contract is stored in the storage unit 74, further querying, by the execution unit 75, current status of JIT compilation for the bytecode of the smart contract, and in a case that the status is under JIT compilation, interpreting and executing the bytecode of the smart contract;

or, when the execution unit 75 is to execute the smart contract deployed, no machine code of the smart contract is stored in the storage unit 74, further querying, by the execution unit 75, current status of JIT compilation for the bytecode of the smart contract, and in a case that no compilation through AoT is started, starting the JIT compilation, and interpreting and executing the bytecode of the smart contract.

Optionally, the number of blockchain nodes in the blockchain network is not less than 3f+1, the predetermined number is not less than 2f+1, and the f is a positive integer.

Optionally, further including:

an interaction unit 76, configured to report, when a consensus on a transaction invoking the smart contract deployed is to reach, the compilation progress of the local JIT compilation against the smart contract deployed to the other blockchain nodes in the blockchain network, and obtain the compilation progress reported by the other blockchain nodes; and determining, by the execution unit 75, the number of blockchain nodes storing the machine code in the blockchain network based on the compilation progress of the blockchain node and the compilation progress reported by the other blockchain nodes.

Optionally, reporting, by the interaction unit 76, when a consensus on the transaction invoking the smart contract deployed is to reach, the compilation progress of the local JIT compilation against the smart contract deployed to the other blockchain nodes in the blockchain network, includes:

if a consensus mechanism based on a practical Byzantine fault-tolerant (PBFT) algorithm is adopted, and the blockchain node is a master node, sending, by the interaction unit 76, a pre-prepare message to the other blockchain nodes in a pre-prepare phase, where the pre-prepare message contains the compilation progress of the blockchain node; and if a consensus mechanism based on the PBFT algorithm is adopted, and the blockchain node is a slave node, sending, by the interaction unit 76, a prepare message to the other blockchain nodes in a prepare phase, where the prepare message contains the compilation progress of the blockchain node; and/or, if a consensus mechanism based on the PBFT algorithm is adopted, sending, by the interaction unit 76, a commit message to the other blockchain nodes in a commit phase, where the commit message contains the compilation progress of the blockchain node.

In addition, a blockchain node for executing a smart contract can also execute previous methods mentioned in S621 through S623.

The present specification further provides an embodiment of a blockchain node, including:

a processor, and a memory with a program stored therein, where a smart contract is executed based on the above-mentioned methods when the processor executes the program.

The present specification further provides embodiments of a storage medium for storing a program, where the program executes the above-mentioned methods when executed.

In the 1990s, whether a technical improvement is a hardware improvement (for example, an improvement to a circuit structure such as a diode, a transistor, or a switch) or a software improvement (an improvement to a method procedure) can be clearly distinguished. However, as technology develop, current improvements to many method procedures can be considered as direct improvements to hardware circuit structures. A designer usually programs an improved method procedure into a hardware circuit, to obtain a corresponding hardware circuit structure. T Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, this type of programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), etc. The very-high-speed integrated circuit hardware description language (VHDL) and Verilog are most commonly used at present. A person skilled in the art should also understand that a hardware circuit that implements a logical method procedure can be readily obtained once the method procedure is logically programmed by using the several above-described hardware description languages and is programmed into an integrated circuit.

A controller can be implemented by using any appropriate way. For example, the controller can take the form of a microprocessor or a processor, or a computer readable medium that stores computer readable program code (such as software or firmware) that can be executed by the microprocessor or the processor, a logic gate, a switch, an application-specific integrated circuit (ASIC), a programmable logic controller, or an embedded microprocessor. Examples of the controller include but are not limited to the following microprocessors: ARC 625D, Atmel AT91SAM, Microchip PIC18F26K20, and Silicon Labs C8051F320. The memory controller can also be implemented as a part of control logic of a memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the embedded microcontroller. Therefore, the controller can be considered as a hardware component, and a device configured to implement various functions in the controller can also be considered as a structure in the hardware component. Or the device configured to implement various functions can even be considered as both a software module implementing the method and a structure in the hardware component. The system, device, module, or unit illustrated in the previous embodiments can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

In a typical configuration, a computing device includes one or more processors (CPU), one or more input/output interfaces, one or more network interfaces, and one or more memories.

The memory may include a non-persistent memory, a random access memory (RAM), and/or a nonvolatile memory and other forms that are in a computer readable medium, for example, a read-only memory (ROM) or a flash memory (flash RAM). The memory is an example of the computer readable medium.

The computer readable medium includes persistent, non-persistent, removable, and irremovable media that can store information by using any method or technology. The information can be a computer readable instruction, a data structure, a program module, or other data. Examples of the computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, a quantum memory, a graphene-based storage medium or another magnetic storage device, or any other non-transmission medium. The computer storage medium can be used to store information accessible by a computing device. As described in the present specification, the computer readable medium does not include computer-readable transitory media such as a modulated data signal and a carrier.

It should also be noted that the terms "include", "comprise", or their any other variants are intended to cover a non-exclusive inclusion, so that a process, a method, a product or a device that includes a list of elements not only includes those elements but also includes other elements that are not expressly listed, or further includes elements inherent to such process, method, product or device. Without more restrictions, an element defined by the sentence "includes a . . . " does not exclude the existence of another element in the process, method, product, or device that includes the element.

Specific embodiments of the present specification are described above. Other embodiments fall within the scope of the appended claims. In some situations, the actions or steps described in the claims can be performed in an order different from the order in the embodiment and the expected results can still be achieved. In addition, the process depicted in the accompanying drawings does not necessarily require a particular order or a sequential order as shown to achieve the expected results. In some embodiments, multitasking and parallel processing are also possible or may be advantageous.

The terms used in one or more embodiments of the present specification are for the purpose of describing particular embodiments only and are not intended to limit one or more embodiments of the present specification. The singular forms of "a", "said" and "the" used in one or more embodiments of the present specification and the appended claims are also intended to include the plural forms, unless other meanings are clearly indicated by the context. It should also be understood that the term "and/or" used herein refers to and includes any or all possible combinations of one or more associated listed items.

It should be understood that although the terms first, second, third, etc. may be used to describe various information in one or more embodiments of the present specification, the information should not be limited to these terms. These terms are only used to distinguish the information of the same type from each other. For example, the first information can also be referred to as the second information, and similarly, the second information can also be referred to as the first information without departing from the scope of one or more embodiments of the present specification. Depending on the context, the word "if" used herein can be explained as "in the case of", "when" or "in response to determine".

The previous descriptions are preferred embodiments of one or more embodiments of the present specification, and are not intended to limit one or more embodiments of the present specification. Any modification, equivalent replacement, or improvement made without departing from the spirit and principle of one or more embodiments of the present specification shall fall within the scope of the claims in one or more embodiments of the present specification.

What is claimed is:

1. A computer-implemented method, comprising:
receiving, by a blockchain node in a blockchain network comprising a plurality of blockchain nodes, a request for creating a smart contract, wherein the request comprises a bytecode of the smart contract;

compiling, by the blockchain node, the bytecode of the smart contract into a machine code of the smart contract through Just-In-Time (JIT) compilation;

starting, by the blockchain node, storing the machine code of the smart contract locally;

receiving, by the blockchain node, a service request that invokes the smart contract;

receiving, by the blockchain node from other blockchain nodes in the blockchain network, compilation progresses of the other blockchain nodes in the blockchain network, reported by the other blockchain nodes in a consensus mechanism of the blockchain network;

determining, by the blockchain node, a number of blockchain nodes that have finished locally storing the machine code of the smart contract in the blockchain network based on a compilation progress of the blockchain node and the compilation progresses of the other blockchain nodes;

performing a determination of whether i) the machine code of the smart contract has been stored locally by the blockchain node and ii) the number of blockchain nodes that have finished locally storing the machine code of the smart contract in the blockchain network is not less than a predetermined number; and executing, by the blockchain node, the smart contract based on the determination.

2. The computer-implemented method of claim 1, wherein executing, by the blockchain node, the smart contract based on the determination comprises:

in response to determining that the machine code of the smart contract is stored locally by the blockchain node and the number of blockchain nodes storing the machine code of the smart contract in the blockchain network is not less than the predetermined number, executing, by the blockchain node, the machine code of the smart contract to execute the smart contract.

3. The computer-implemented method of claim 1, wherein compiling, by the blockchain node, the bytecode of the smart contract into the machine code of the smart contract through the JIT compilation comprises:

performing the JIT compilation on the bytecode of the smart contract after completing creation of the smart contract; or performing the JIT compilation on the bytecode of the smart contract during a period of time when a service load of the blockchain node is less than a threshold; or performing, the JIT compilation on the bytecode of the smart contract when the blockchain node receives a transaction request to invoke the smart contract created.

4. The computer-implemented method of claim 1, wherein compiling the bytecode of the smart contract into the machine code of the smart contract through the JIT compilation, comprises: in a process of translating or executing the bytecode of the smart contract, identifying, by the blockchain node, a hotspot bytecode, wherein the hotspot bytecode comprises a bytecode with an execution frequency higher than a threshold, and performing compilation to obtain the machine code of the smart contract; or performing, by the blockchain node, an optimization of compilation on the bytecode to obtain the machine code of the smart contract.

5. The computer-implemented method of claim 4, wherein a granularity of the hotspot bytecode comprises a function level or a code block level.

6. The computer-implemented method of claim 1, wherein executing, by the blockchain node, the smart contract comprises:

executing, by the blockchain node, a machine code corresponding to an invoked function or a code block in the smart contract.

7. The computer-implemented method of claim 1, wherein executing, by the blockchain node, the smart contract based on the determination comprises:

in response to determining, by the blockchain node, that no machine code of the smart contract is stored locally, or the number of blockchain nodes storing the machine code of the smart contract in the blockchain network is less than the predetermined number, interpreting and executing, by the blockchain node, the bytecode of the smart contract.

8. The computer-implemented method of claim 7, wherein interpreting and executing, by the blockchain node, the bytecode of the smart contract, comprises:

interpreting and executing, by the blockchain node, a bytecode corresponding to an invoked function in the smart contract.

9. The computer-implemented method of claim 7, wherein determining, by the blockchain node that no machine code of the smart contract is stored locally comprises:

determining, by the blockchain node, that no machine code of the smart contract is stored locally;

further querying, by the blockchain node, a current status of the JIT compilation for the bytecode of the smart contract; and in response to determining that the JIT compilation is not started, starting, by the blockchain node, the JIT compilation.

10. The computer-implemented method of claim 1, wherein a number of the plurality of blockchain nodes in the blockchain network is not less than 3f+1, the predetermined number is not less than 2f+1, and f is a positive integer.

11. The computer-implemented method of claim 1, further comprising:

reporting, by the blockchain node to other blockchain nodes in the blockchain network in a consensus mechanism, the compilation progress of the blockchain node, wherein the compilation progress of the blockchain node comprises a compilation progress of the JIT compilation of the smart contract.

12. The computer-implemented method of claim 11, wherein the blockchain node is a master node in the consensus mechanism, the blockchain node sends a pre-prepare message in a pre-prepare phase to the other blockchain nodes, wherein the pre-prepare message contains the compilation progress of the JIT compilation of the smart contract on the blockchain node in the pre-prepare phase; or wherein the blockchain node is a slave node in the consensus mechanism, the blockchain node sends a prepare message in a prepare phase to the other blockchain nodes, wherein the prepare message contains the compilation progress of the JIT compilation of the smart contract on the blockchain node in the prepare phase.

13. The computer-implemented method of claim 11, comprising:

sending, by the blockchain node, a commit message in a commit phase to the other blockchain nodes, wherein the commit message contains the compilation progress of the JIT compilation of the smart contract on the blockchain node in the commit phase.

14. The computer-implemented method of claim 1, wherein storing, by the blockchain node, the machine code of the smart contract locally comprises caching, by the blockchain node, the machine code of the smart contract locally.

15. A computer-implemented method, comprising:
in response to determining that a smart contract is deployed on a blockchain node in a blockchain network comprising a plurality of blockchain nodes, starting, by the blockchain node, to turn a bytecode of the smart contract into a machine code of the smart contract through Just-In-Time (JIT) compilation;
staring, by the blockchain node, storing the machine code of the smart contract locally;
receiving, by the blockchain node, a service request that invokes the smart contract;
receiving, by the blockchain node from other blockchain nodes in the blockchain network, compilation progresses of the other blockchain nodes in the blockchain network, reported by the other blockchain nodes in a consensus mechanism of the blockchain network;
determining, by the blockchain node, a number of blockchain nodes that have finished locally storing the machine code of the smart contract in the blockchain network based on a compilation progress of the blockchain node and the compilation progresses of the other blockchain nodes;
performing a determination of whether i) the machine code of the smart contract has been stored locally by the blockchain node and ii) the number of blockchain nodes that have finished locally storing the machine code of the smart contract in the blockchain network is not less than a predetermined number; and
executing, by the blockchain node, the smart contract based on the determination.

16. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving, by a blockchain node in a blockchain network comprising a plurality of blockchain nodes, a request for creating a smart contract, wherein the request comprises a bytecode of the smart contract;
compiling, by the blockchain node, the bytecode of the smart contract into a machine code of the smart contract through Just-In-Time (JIT) compilation;
staring, by the blockchain node, storing the machine code of the smart contract locally;
receiving, by the blockchain node, a service request that invokes the smart contract;
receiving, by the blockchain node from other blockchain nodes in the blockchain network, compilation progresses of the other blockchain nodes in the blockchain network, reported by the other blockchain nodes in a consensus mechanism of the blockchain network;
determining, by the blockchain node, a number of blockchain nodes that have finished locally storing the machine code of the smart contract in the blockchain network based on a compilation progress of the blockchain node and the compilation progresses of the other blockchain nodes;
performing a determination of whether i) the machine code of the smart contract has been stored locally by the blockchain node and ii) the number of blockchain nodes that have finished locally storing the machine code of the smart contract in the blockchain network is not less than a predetermined number; and
executing, by the blockchain node, the smart contract based on the determination.

17. The computer-implemented system of claim 16, wherein executing, by the blockchain node, the smart contract based on the determination comprises:
in response to determining that the machine code of the smart contract is stored locally by the blockchain node and the number of blockchain nodes storing the machine code of the smart contract in the blockchain network is not less than the predetermined number, executing, by the blockchain node, the machine code of the smart contract to execute the smart contract.

18. The computer-implemented system of claim 16, wherein compiling, by the blockchain node, the bytecode of the smart contract into the machine code of the smart contract through the JIT compilation comprises:
performing the JIT compilation on the bytecode of the smart contract after completing creation of the smart contract; or
performing the JIT compilation on the bytecode of the smart contract during a period of time when a service load of the blockchain node is less than a threshold; or
performing, the JIT compilation on the bytecode of the smart contract when the blockchain node receives a transaction request to invoke the smart contract created.

19. The computer-implemented system of claim 16, wherein compiling the bytecode of the smart contract into the machine code of the smart contract through the JIT compilation, comprises: in a process of translating or executing the bytecode of the smart contract,
identifying, by the blockchain node, a hotspot bytecode, wherein the hotspot bytecode comprises a bytecode with an execution frequency higher than a threshold, and performing compilation to obtain the machine code of the smart contract; or
performing, by the blockchain node, an optimization of compilation on the bytecode to obtain the machine code of the smart contract.

20. The computer-implemented system of claim 16, wherein executing, by the blockchain node, the smart contract based on the determination comprises:
in response to determining, by the blockchain node, that no machine code of the smart contract is stored locally, or the number of blockchain nodes storing the machine code of the smart contract in the blockchain network is less than the predetermined number, interpreting and executing, by the blockchain node, the bytecode of the smart contract.

* * * * *